(12) United States Patent
Kosaka

(10) Patent No.: US 11,891,177 B2
(45) Date of Patent: Feb. 6, 2024

(54) DISC-TYPE VERTICAL TAKE-OFF AND LANDING AIRCRAFT

(71) Applicant: SUBARU CORPORATION, Tokyo (JP)

(72) Inventor: Mitsuru Kosaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 8 days.

(21) Appl. No.: 17/642,820

(22) PCT Filed: Sep. 28, 2020

(86) PCT No.: PCT/JP2020/036500
§ 371 (c)(1),
(2) Date: Mar. 14, 2022

(87) PCT Pub. No.: WO2021/079687
PCT Pub. Date: Apr. 29, 2021

(65) Prior Publication Data
US 2022/0380040 A1    Dec. 1, 2022

(30) Foreign Application Priority Data
Oct. 24, 2019    (JP) ................................. 2019-193347

(51) Int. Cl.
*B64C 39/06* (2006.01)
*B64C 11/18* (2006.01)

(52) U.S. Cl.
CPC ............ *B64C 39/064* (2013.01); *B64C 11/18* (2013.01)

(58) Field of Classification Search
CPC ..... B64C 27/20; B64C 39/064; B64C 39/001; F04D 29/22; F04D 29/2216; F04D 29/2238
See application file for complete search history.

(56) References Cited

U.S. PATENT DOCUMENTS

| 5,170,963 A * | 12/1992 | Beck, Jr. ................ B64C 39/064 |
| | | 244/73 C |
| 6,595,753 B1 * | 7/2003 | Illingworth ............. B64C 11/48 |
| | | 416/185 |

(Continued)

FOREIGN PATENT DOCUMENTS

| CN | 108706103 A | * 10/2018 | ........... B64C 39/001 |
| CN | 106379534 B | * 11/2018 | ........... B64C 39/001 |

(Continued)

OTHER PUBLICATIONS

International Search Report (ISR) (PCT Form PCT/ISA/210), in PCT/JP2020/036500, dated Dec. 1, 2020.

(Continued)

*Primary Examiner* — Philip J Bonzell
*Assistant Examiner* — Anna L. Gordon
(74) *Attorney, Agent, or Firm* — MCGINN I.P. LAW GROUP, PLLC

(57) ABSTRACT

A disc-type vertical take-off and landing aircraft includes the following. A skirt widens toward the bottom. A disc-shaped rotor is positioned on a lower side of the skirt and rotates with relation to the skirt. A plurality of blades are provided standing on an upper surface of the rotor and are positioned radially from a center of the rotor. A cutout is formed in each of the plurality of blades. When the rotor rotates, centrifugal force causes an airflow along the blade rotating with the rotor, the airflow swirls in a spiral by a flow of air flowing over the cutout of the blade in a direction substantially orthogonal to the blade, the airflow flows in a radial direction of the rotor along the blade while swirling in the spiral, and the airflow ejected downward by the skirt causes ascending.

16 Claims, 8 Drawing Sheets

(56) References Cited

U.S. PATENT DOCUMENTS

| | | | | |
|---|---|---|---|---|
| 8,800,753 B2* | 8/2014 | Kearney | ............. | B65H 29/241 |
| | | | | 198/689.1 |
| 2017/0342999 A1* | 11/2017 | Kamrath | .................. | F04D 1/14 |

FOREIGN PATENT DOCUMENTS

| | | | | | | |
|---|---|---|---|---|---|---|
| CN | 109436324 | A | * | 3/2019 | | |
| GB | 2471770 | A | * | 1/2011 | ........... | B64C 39/064 |
| JP | 2008-137527 | A | | 6/2008 | | |
| JP | 3150942 | U | | 6/2009 | | |
| JP | 2010-149662 | A | | 7/2010 | | |
| WO | WO-2019240351 | A1 | * | 12/2019 | ............ | B64C 19/00 |

OTHER PUBLICATIONS

International Preliminary Report on Patentability (PCT Chapter I) dated Apr. 26, 2022 for International Application No. PCT/JP2020/036500, and English Translation thereof.

\* cited by examiner

DISC-TYPE VERTICAL TAKE-OFF AND LANDING AIRCRAFT

TECHNICAL FIELD

The present invention relates to a disc-type vertical take-off and landing aircraft.

BACKGROUND ART

As an aircraft with a different flight principle from aircrafts such as airplanes, helicopters, and the like, various disc-type vertical take-off and landing aircrafts have been proposed (see, for example, Patent Literature 1-3). Such disc-type vertical take-off and landing aircrafts are configured so that the entire shape is a disc shape, and vertical take-off and landing are performed by ejecting an airflow downwards.

Such disc type vertical take-off and landing aircrafts are configured to include a conical skirt and an air blowing device positioned in a central portion of the skirt. The air drawn in from above, etc. by the air blowing device is blown out in a horizontal direction, the air flows along an inner surface of the skirt and is ejected downward, and the aircraft is raised by the reaction of the blown air.

CITATION LIST

Patent Literature

[Patent Literature 1] JP 2008-137527 A
[Patent Literature 2] JP 3150942 U
[Patent Literature 3] JP 2010-149662 A

SUMMARY OF INVENTION

Technical Problem

In conventional disc-type vertical take-off and landing aircrafts, the lift force (ascending force) that can be obtained is small. Therefore, normally, such aircrafts can be used only as toys, and could not be used as a manned or unmanned aircraft with a heavy weight.

As a result of conducting intensive research regarding a disc-type vertical take-off and landing aircraft which can be ascended even if the aircraft has a heavy weight such as a manned or an unmanned aircraft, the inventor of the present invention was able to find a configuration that can achieve a lift force with which an aircraft with heavy weight can be ascended.

The present invention is conceived in view of the above points, and the purpose of the present invention is to provide a disc-type vertical take-off and landing aircraft which can ascend accurately even when it is heavy.

Solution to Problem

In order to solve the above problem, according to aspect 1 of the present invention, a disc-type vertical take-off and landing aircraft includes: a skirt that widens toward the bottom; a disc-shaped rotor that is positioned on a lower side of the skirt and that rotates with relation to the skirt; and a plurality of blades that are provided standing on an upper surface of the rotor and that are positioned radially from a center of the rotor, wherein a cutout is formed in each of the plurality of blades, and wherein when the rotor rotates, centrifugal force causes an airflow along the blade rotating with the rotor, the airflow swirls in a spiral by a flow of air flowing over the cutout of the blade in a direction substantially orthogonal to the blade, the airflow flows in a radial direction of the rotor along the blade while swirling in the spiral, and the airflow ejected downward by the skirt causes ascending.

According to aspect 2, the disc-type vertical take-off and landing aircraft according to aspect 1, wherein a cylindrical fan is positioned above the rotor, the cylindrical fan including a fan blade that rotates and sends air to a central portion of the rotor.

According to aspect 3, the disc-type vertical take-off and landing aircraft according to aspect 1 or 2, wherein an opening and closing unit that is able to open and close is formed in a portion of a lower end of the skirt, and wherein when the opening and closing unit opens, the airflow flowing in a radial direction of the rotor along the blade is ejected straight without a direction being changed by the skirt.

According to aspect 4, the disc-type vertical take-off and landing aircraft according to any one of aspects 1 to 3, wherein oscillators are formed in a plurality of positions in a lower end of the skirt, each of the oscillators capable of oscillating toward an inner side of the skirt, and the oscillating angles of the oscillators are set to be different from each other and a difference in lift force can be generated in each portion of the disc-type vertical take-off and landing aircraft where the oscillators are formed.

According to aspect 5, the disc-type vertical take-off and landing aircraft according to any one of aspects 1 to 4, further comprising a guide on an inner surface of the skirt, wherein the guide changes an ejecting direction of the airflow and changes a direction and or magnitude of a force that rotates the skirt around a central axis of the skirt.

Advantageous Effects of Invention

According to the present invention, the disc-type vertical take-off and landing aircraft is able to accurately ascend even when the aircraft is heavy.

DESCRIPTION OF EMBODIMENTS

Hereinbelow, embodiments of the disc-type vertical take-off and landing aircraft according to the present invention is described with reference to the drawings.

Although the disc-type vertical take-off and landing aircraft described below is unmanned, the aircraft can also be configured to be manned.

Figure 1A:
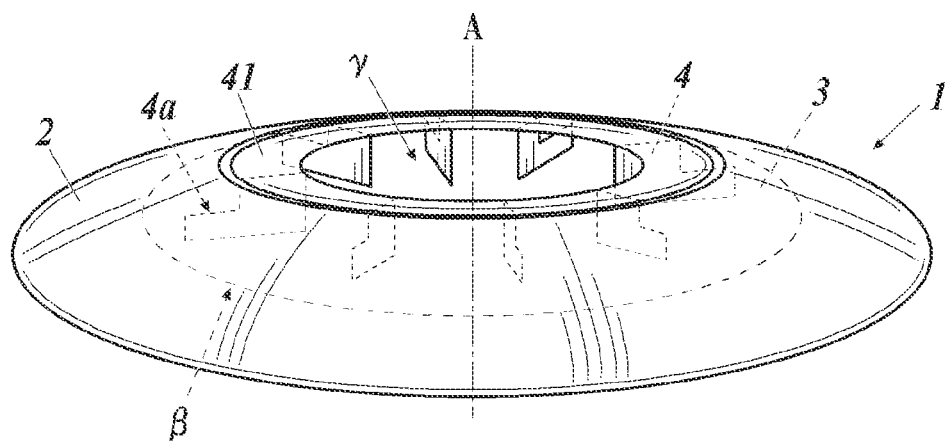
FIG. 1A is a diagram showing a configuration of a main portion of a disc-type vertical take-off and landing aircraft according to a present embodiment.
Figure 1B:
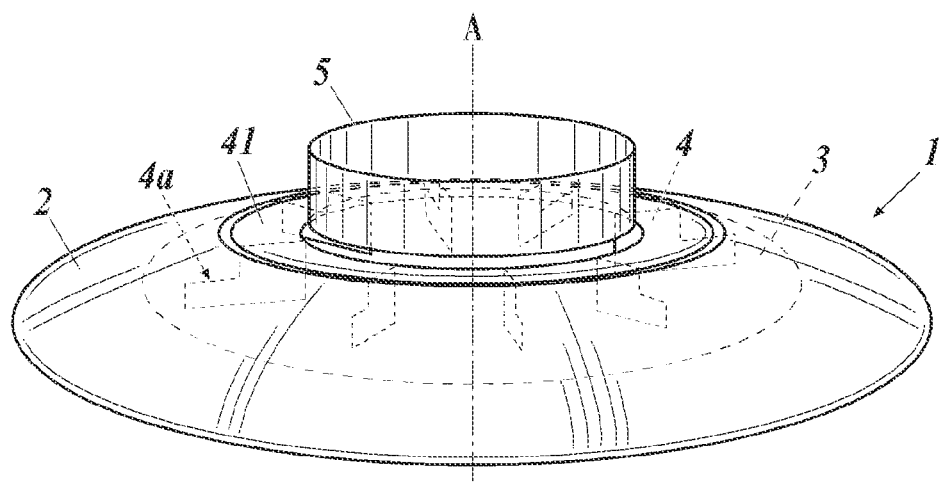
FIG. 1B is a diagram showing a configuration including a cylindrical fan.
Figure 2A:
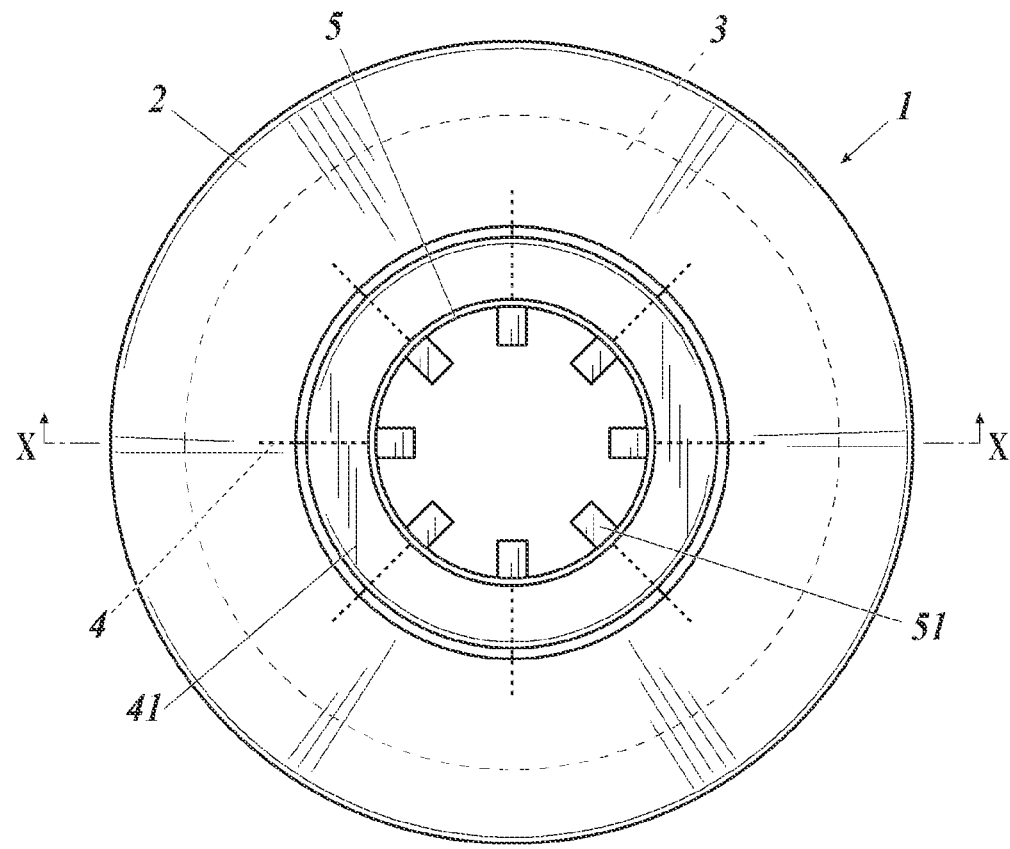
FIG. 2A is a plan view of a disc-type vertical take-off and landing aircraft shown in FIG. 1B.
Figure 2B:
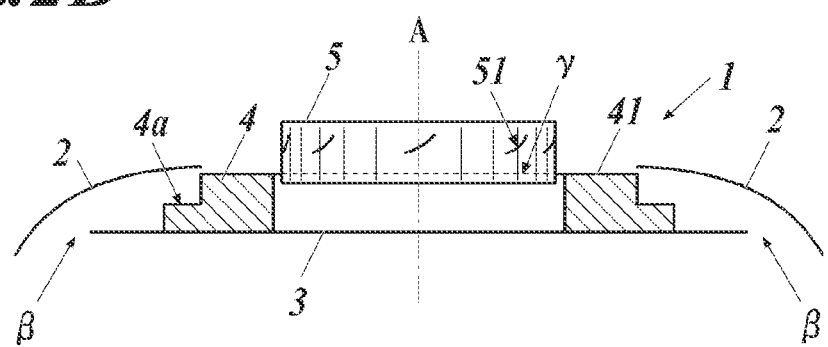
FIG. 2B is a cross-sectional view along line X-X shown in FIG. 2A.

FIG. 1A is a diagram showing a configuration of a main portion of a disc-type vertical take-off and landing aircraft according to the present embodiment, and FIG. 1B is a diagram showing a configuration including a cylindrical fan. FIG. 2A is a plan view of the disc-type vertical take-off and landing aircraft shown in FIG. 1B, and FIG. 2B is a cross-sectional view along line X-X shown in FIG. 2A.

Figure 3:
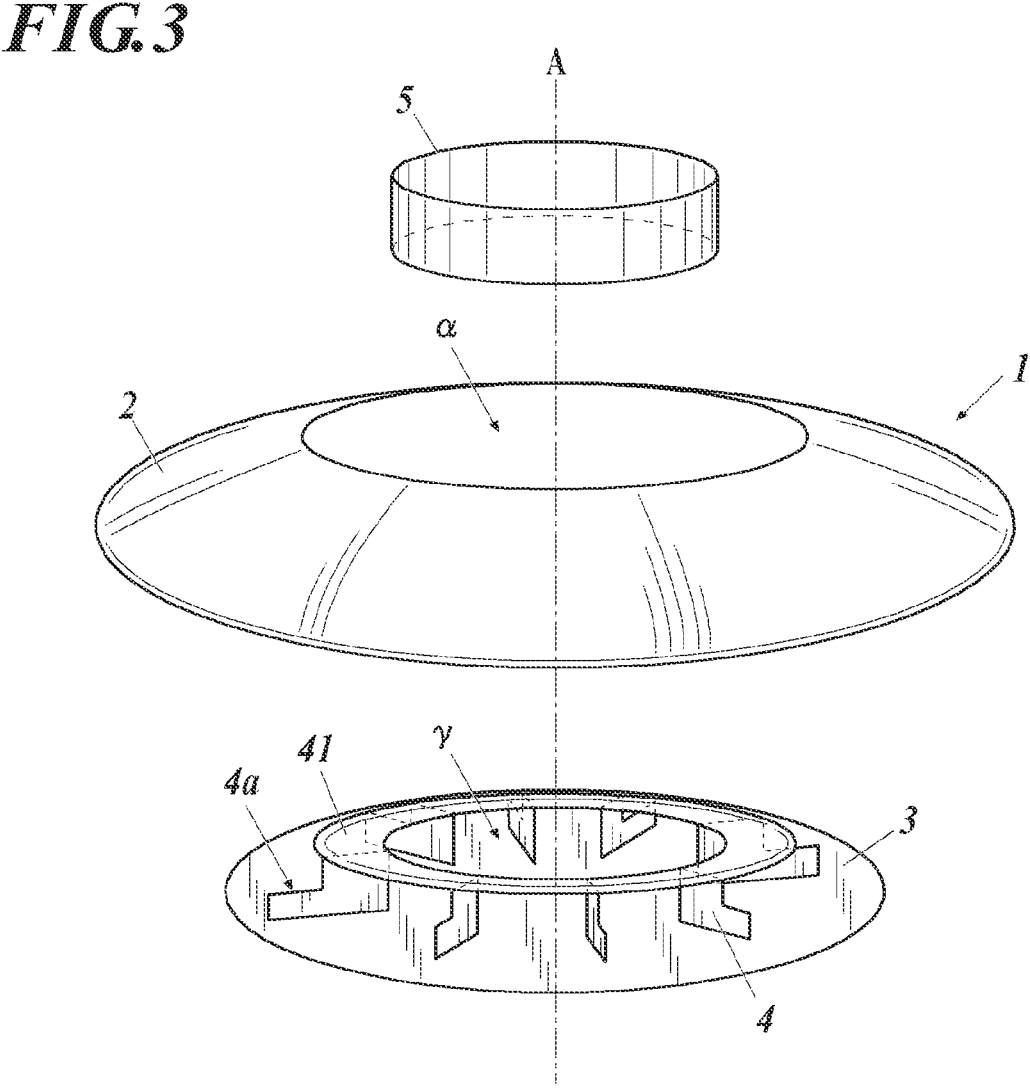
FIG. 3 is an exploded perspective view showing the disc-type vertical take-off and landing aircraft shown in FIG. 1B in a state disassembled into a cylindrical fan, skirt, and rotor.

FIG. 3 is an exploded perspective view showing the disc-type vertical take-off and landing aircraft shown in FIG. 1B disassembled into a cylindrical fan, a skirt, and a rotor. Illustration of fan blades of the cylindrical fan is omitted in FIG. 1B, FIG. 3, etc.

The disc-type vertical take-off and landing aircraft 1 according to the present embodiment includes a skirt 2, a rotor 3, and a plurality of blades 4. As shown in FIG. 1B, etc., the aircraft may further include a cylindrical fan 5.

The skirt 2 is provided with an opening α (see FIG. 3) at the center, and is in a circular shape that widens toward the bottom. In FIG. 2B, the side of the skirt 2 is formed in a curved shape, but the skirt 2 may be a conical shape, for example.

A disc shaped rotor 3 is positioned on the lower side of the skirt 2. The rotor 3 is configured to rotate around a central axis A with relation to the skirt 2. Although depending on the configuration and material employed in the disc-type vertical take-off and landing aircraft 1, the rotor 3 rotates at a high speed of a few tens of thousands of rpm.

The configuration in order to rotate the rotor 3 is described later. When the rotor 3 is provided in the skirt 2, as shown in FIG. 2B, an opening β (gap) is formed between the inner surface of the skirt 2 and the end portion of the rotor 3.

A plurality of blades 4 are provided standing on the upper surface of the rotor 3. Each blade 4 is positioned radially from the center of the rotor 3.

According to the present embodiment, each blade 4 is provided standing vertically from the rotor 3. Alternatively, each blade 4 may be provided standing diagonally with relation to the rotor 3.

According to the present embodiment, a plate shaped member 41 provided with an opening γ (see FIG. 3) at the central portion is attached on the upper ends of the blades 4. Each blade 4 is linked by the plate shaped member 41.

When the rotor 3 is positioned in the skirt 2, the plate shaped member 41 is positioned inside the opening α (actually slightly downward from the opening α (see FIG. 2B)) at the central portion of the skirt 2.

Therefore, in a state in which the rotor 3 is positioned in the skirt 2, that is, in a state shown in FIG. 1A, for example, if air flows in from the opening γ at the central portion of the plate shaped member 41, the air passes between the blades 4, that is, the space formed surrounded by the skirt 2, the rotor 3, and the plate shaped member 41, and the portions divided by each plate 4.

Then, the air flows along the blade 4 in the radial direction of the rotor 3, passes the opening β, and is ejected downward from the skirt 2.

As described above, in the disc-type vertical take-off and landing aircraft 1 according to the present embodiment, an internal space formed surrounded by the skirt 2, the rotor 3, etc. and an air path divided by the blades 4 are formed.

If the rotor 3 is rotated with relation to the skirt 2 as described above, an air flow is generated by centrifugal force along the blade 4 that rotates with the rotor 3.

In order to generate such airflow, outside air is sucked in from the opening γ of the central portion of the plate shaped member 41, and the air flow passes each path divided by each blade 4. Then, the air flow is ejected downward from the opening β between the skirt 2 and the rotor 3.

Cutouts 4a formed in each blade 4 and the swirl in a spiral shape that occurs in the airflow are described later.

According to the present embodiment, as described later, the air in the opening γ portion in the central portion of the plate shaped member 41 flows along the blade 4 and is ejected from the opening β between the skirt 2 and the rotor 3. Therefore, the opening γ portion in the central portion of the plate shaped member 41, that is, the central portion of the rotor 3 becomes a negative pressure.

Further, according to the present embodiment, as shown in FIG. 1B, etc., a cylindrical fan 5 is provided above the central portion of the rotor 3. The cylindrical fan 5 rotates and sends air to the central portion of the rotor 3.

Similar to the rotor 3, the cylindrical fan 5 is configured to rotate around the central axis A with relation to the skirt 2.

According to the present embodiment, the cylindrical fan 5 rotates with the same axis (that is, around the central axis A) in the same rotating direction at the same rotating speed as the rotor 3. The above example is described below, but the cylindrical fan 5 and the rotor 3 do not have to have the same rotating axis, the same rotating direction or the same rotating speed. The configuration to rotate the cylindrical fan 5 is described later.

A plurality of fan blades 51 are provided on an inner surface of a cylinder portion of the cylinder fan 5 so as to project inward in a substantial horizontal direction.

Each fan blade 51 includes a blade cross section and is provided so that the blade surface is tilted with respect to a horizontal surface. When the cylindrical fan rotates, the air above the cylindrical fan 5 is sucked in and the air is pressed downward. The flow ejected from the cylinder is diffused in all directions by the rotation of the cylinder and the air is sent to the blade 4.

Here, an example of the configuration of the disc-type vertical take-off and landing aircraft 1 according to the present embodiment is described.

Figure 4A:
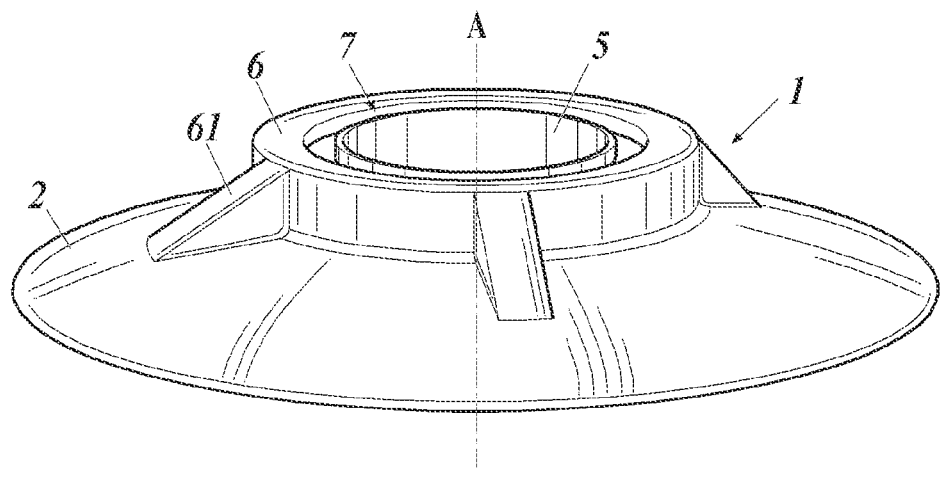
FIG. 4A is a diagram showing an example of a configuration of a disc-type vertical take-off and landing aircraft according to the present embodiment.
Figure 4B:
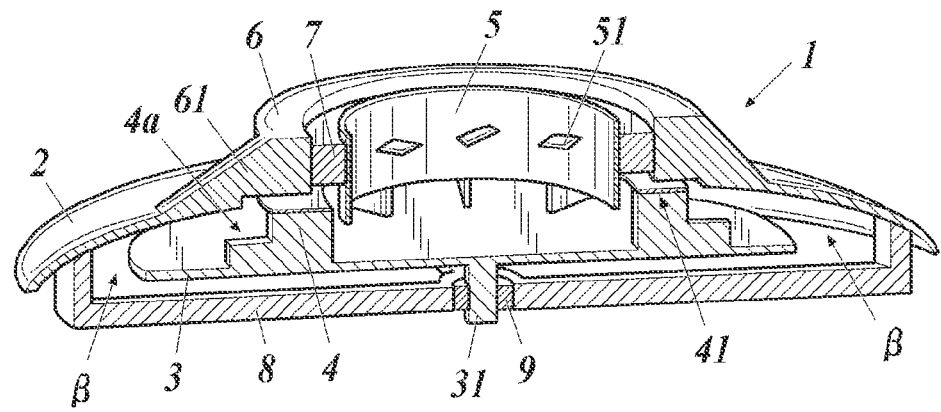
FIG. 4B is a diagram showing a state in which the disc-type vertical take-off and landing aircraft shown in FIG. 4A is virtually cut at a surface including a central axis.

FIG. 4A is a diagram showing an example of a configuration of a disc-type vertical take-off and landing aircraft according to the present embodiment. FIG. 4B is a diagram showing a state in which the disc-type vertical take-off and landing aircraft shown in FIG. 4A is virtually cut at a surface including the central axis A.

According to the example of the configuration of the disc-type vertical take-off and landing aircraft 1, a cylinder shaped upper column 6 is attached to the skirt 2 with legs 61, or is formed as one with the skirt 2, and the upper column 6 is positioned on the upper side of the central portion of the skirt 2.

The cylindrical fan 5 is positioned on the inner side of the cylinder portion of the upper column 6 with a bearing 7 in between.

The cylindrical fan 5 is able to rotate around the central axis A with the bearing 7, and is supported so as not to move in a vertical direction with relation to the upper column 6.

The cylindrical fan 5 rotates around the central axis A by a driving mechanism such as a motor which is not shown provided in the upper column 6.

A shaft 31 projecting downward is provided in the central portion of the rotor 3 provided with the blade 4. The shaft 31 is supported by a lower column 8 attached to the lower surface of the skirt 2 with a bearing 9 in between. The lower column 8 is formed with a narrow square bar or the like so as not to prevent ejecting of the airflow from the opening β between the skirt 2 and the rotor 3 as described above.

A driving mechanism such as a motor (not shown) is provided in the lower edge portion of the shaft 31 in the lower column 8, and the rotor 3 rotates around the central axis A by rotating the shaft 31 with the driving mechanism.

Next, the cutout in each blade 4 and the ascending principle of the disc-type vertical take-off and landing aircraft 1 according to the present embodiment are described.

According to the present embodiment, as shown in the drawings such as FIG. 1A, a cutout 4a is formed on the upper edge on the outer side viewed from the central axis A in each of the plurality of blades 4 provided standing on the upper surface of the rotor 3. Each drawing shows an example in which the cutout 4a is formed in a rectangular shape (that is, a rectangular cutout formed in the rectangular blade 4), but the cutout 4a does not have to be a rectangular shape. The blade 4 also does not have to be a rectangular shape.

The ascending principle of the disc-type vertical take-off and landing aircraft 1 according to the present embodiment is described below.

Figure 5A:
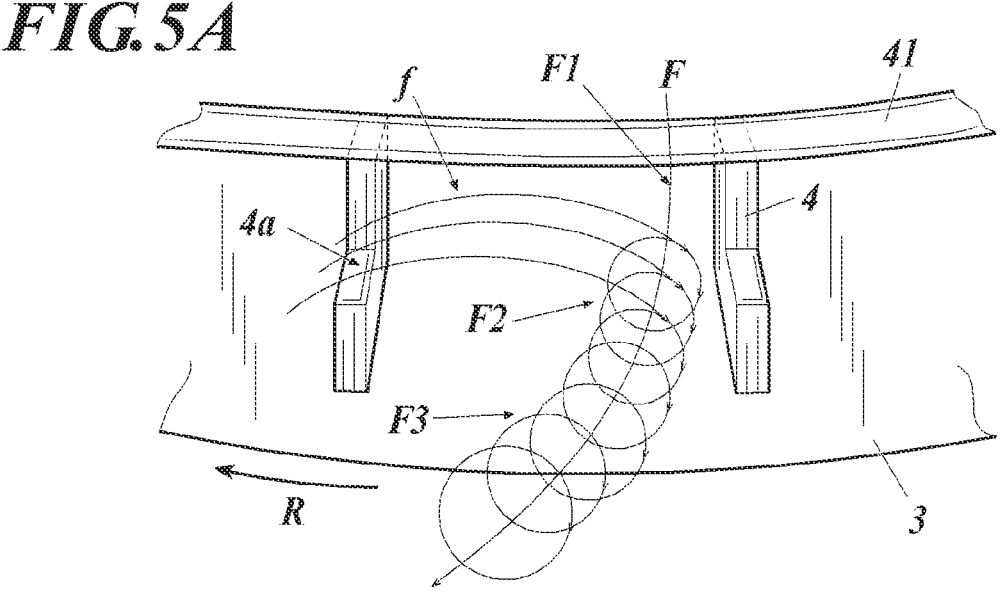
FIG. 5A is a diagram describing an airflow flowing along a blade swirling in a spiral shape.
Figure 5B:
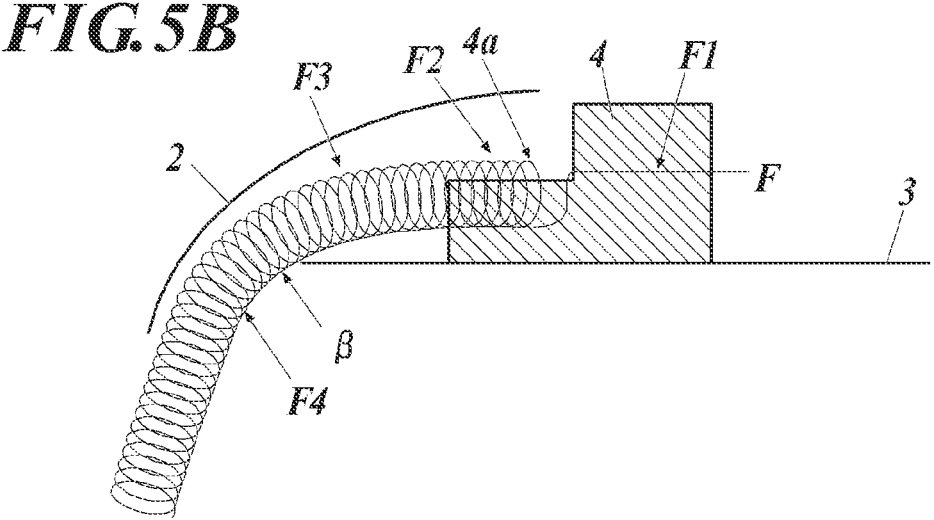
FIG. 5B is a diagram describing an airflow flowing along a blade swirling in a spiral shape.

When the rotor 3 is rotated at a high speed in a direction shown with an arrow R in FIG. 5A, as shown in FIG. 5A and FIG. 5B, the air in the central portion of the rotor 3 flows along the blade 4 by the centrifugal force. Therefore, as shown in FIG. 5A and FIG. 5B, an air flow F is generated along the blade 4 rotating with the rotor 3 (see F1 in the drawing).

Due to the high-speed rotation of the rotor 3, the air on the front side of the rotating direction of the blade 4 passes over the cutout 4a of the blade 4 and flows in a substantial orthogonal direction to the blade 4. Then, a flow f of air flowing to the rear side of the rotating direction of the blade 4 is generated.

Then, the flow f of air that goes over the cutout 4a of the blade 4 is swirled due to the difference in speed with the low speed region in the rear of the cutout 4a. Therefore, the airflow F flowing along the blade 4 swirls, and the airflow F flows along the blade 4 while swirling in a spiral shape (see F2 shown in the drawings).

The reason why the airflow F is drawn curved in the left direction of the drawing in FIG. 5A is because while the airflow F flows along the blade 4, the blade 4 moves in the left direction of the drawing due to the rotation of the rotor 3. Therefore, the airflow F is shown to move in the left direction of the drawing, and this does not mean that the airflow F flows away from the blade 4.

Then, the airflow F flows along the blade 4 while swirling in a spiral, and even after separating from the blade 4, while flowing in the radial direction of the rotor 3, the rotating speed of the swirl increases due to the friction with the rotating rotor 3 and the still skirt 2 (see F3 shown in the drawings).

Then, the airflow F flows in the radial direction of the rotor 3 while swirling in a spiral at a high speed, the progressing direction of the airflow F is changed downward by the skirt 2, and the airflow F is ejected downward from the opening β between the skirt 2 and the rotor 3 (see F4 shown in the drawings).

Figure 6:
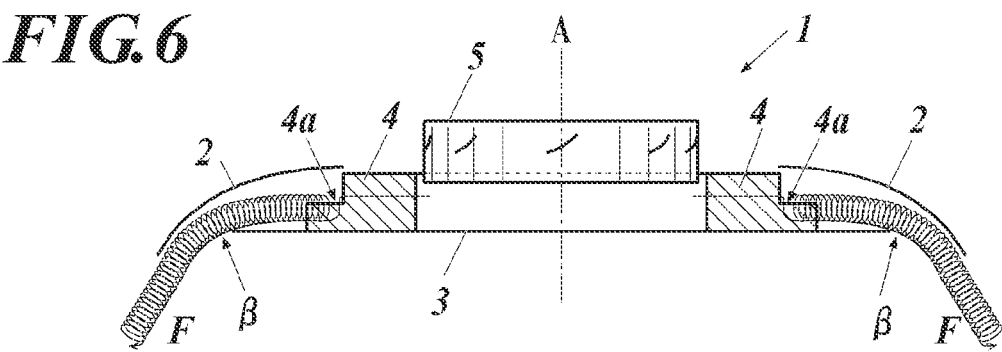
FIG. 6 is a cross-sectional view showing a state in which an air flow swirling in a spiral shape at a high speed being generated at each blade on a rotor and being ejected downward by a skirt.

Then, the airflow F swirling in a spiral at a high speed is generated by all of the blades 4 formed in the rotor 3, and as shown in FIG. 6, the airflow F is ejected downward by the skirt 2.

Then, the disc-type vertical take-off and landing aircraft 1 ascends by a reaction to the airflow F ejected downwards.

The above is the ascending principle of the disc-type vertical take-off and landing aircraft 1 according to the present embodiment.

According to the disc-type vertical take-off and landing aircraft 1, if the cutout 4a is not formed in the blade 4, when the rotor 3 rotates, the air in the central portion of the rotor 3 flows along the blade 4 due to the centrifugal force and the airflow F (F1) occurs. However, the flow is diffused as the flow progresses in the radial direction of the rotor 3 and the flow velocity decreases.

Even after the airflow F is ejected downward, the ejected airflow is diffused and the flow velocity of the ejected airflow drastically decreases, therefore, not much lift force (ascending force) can be obtained.

In contrast, by providing a cutout 4a in the blade 4 as in the disc-type vertical take-off and landing aircraft 1 according to the present embodiment, the airflow F flowing along the blade 4 swirls, and the airflow F flows in the radial direction of the rotor 3 along the blade 4 while swirling in a spiral shape.

Therefore, even if the airflow F flows in the radial direction of the rotor 3, the airflow F is not diffused. Consequently, kinetic energy of the airflow F in the radial direction is maintained and the decrease in the flow velocity is suppressed.

Then, when the airflow F is ejected downward by the skirt 2 from the opening β between the skirt 2 and the rotor 3, the state swirled in a spiral is maintained. Therefore, the airflow F is not diffused and the kinetic energy of the airflow F in the ejecting direction is maintained at a high state even after ejecting.

Therefore, since the airflow F is powerfully jetted downward, the disc-type vertical take-off and landing aircraft 1 according to the present embodiment is able to achieve a very large lift force.

As described above, since a highly large lift force (ascending force) can be obtained in the disc-type vertical take-off and landing aircraft 1 according to the present embodiment, the disc-type vertical take-off and landing aircraft 1 can be sufficiently ascended even when the disc-type vertical take-off and landing aircraft 1 is heavy.

Therefore, according to the disc-type vertical take-off and landing aircraft 1 of the present embodiment, the aircraft can be reliably ascended even when the disc-type vertical take-off and landing aircraft 1 is heavy such as in a manned or unmanned aircraft.

According to the present embodiment, as described above, the air in the central portion of the rotor 3 flows as the airflow F by the centrifugal force. Therefore, the central portion of the rotor 3 (that is, portion of the opening γ in the center of the plate shaped member 41) becomes a negative pressure. Since the rotor 3 rotates at a high speed, the central portion of the rotor 3 becomes a high negative pressure.

According to the present embodiment, as described above, the airflow F flowing along the blade 4 swirls in a spiral shape, and the center of the swirl becomes a negative pressure. Therefore, the negative pressure in the central portion of the rotor 3 is further increased.

When the degree of the negative pressure in the central portion of the rotor 3 is increased, the air in this portion is rapidly cooled, and water vapor in the air condenses. Due to the condensation of the water vapor, volume of the air in this portion rapidly decreases.

Therefore, since the central portion of the rotor 3 becomes a very high negative pressure, a large amount of air existing above is sucked in from the opening γ at the center of the plate shaped member 41.

As described above, the disc-type vertical take-off and landing aircraft 1 according to the present embodiment sucks in a large amount of air from above and is also able to strongly eject downward the airflow F swirled in a spiral.

Therefore, it is possible to obtain a very large lift force (ascending force) in the disc-type vertical take-off and landing aircraft 1 according to the present embodiment.

As shown in FIG. 1B, if the above-described cylindrical fan 5 is provided above the central portion of the rotor 3 (that is, opening γ in the center of the plate shaped member 41), the air above can be sent efficiently to the blade 4 by the rotation of the cylindrical fan 5.

Therefore, since an airflow sent by the cylindrical fan 5 is added to the airflow F generated by the centrifugal force due to the rotation of the rotor 3, the flow velocity of the airflow F flowing along the blade 4 in the radial direction of the rotor 3 is increased, and the flow velocity of the ejected (jetted) airflow F increases even more. Consequently, it is possible to further enhance the lift force (ascending force) of the disc-type vertical take-off and landing aircraft 1.

As described above, according to the present embodiment, the central portion of the rotor 3 in the disc-type vertical take-off and landing aircraft 1 becomes the negative pressure and the air in this portion is cooled. However, if the thermal conductivity of the material used in the rotor 3 and the blade 4 is low, even if the air in the central portion of the rotor 3 is cooled, the rotor 3 and the blade 4 are not cooled. Consequently, the air is heated by the rotor 3 or the blade 4, and this may interfere with the cooling of the air in this portion.

In view of the above, if the rotor 3 and the blade 4 are formed of a material with high thermal conductivity such as metal, the air in the central portion of the rotor 3 is easily cooled, and this is preferable.

If the rotor 3 and the blade 4 are formed of a material with high density, a large inertia force can be obtained when the rotor 3 is rotated at a high speed.

Therefore, for example, even if the orientation of the disc-type vertical take-off and landing aircraft 1 suddenly changes due to a gust of wind, the high speed rotation of the rotor 3 can be maintained without being influenced by the change in the orientation.

[Movement in Horizontal Direction]

In the above embodiments, the ascending of the disc-type vertical take-off and landing aircraft 1 is described. On the other hand, it is possible to decrease the rotating speed of the rotor 3 and to reduce the flow velocity of the discharged (jetted) airflow F. With this, it is possible to decrease the altitude of the disc-type vertical take-off and landing aircraft 1 and land the aircraft.

According to the configuration described below, it is possible to move the disc-type vertical take-off and landing aircraft 1 in a horizontal direction (that is, to move forward, to move backward, or to move sideways).

That is, an opening and closing unit that can open and close is formed in a portion of the lower edge of the skirt 2. By opening the opening and closing unit, the airflow F flowing in the radial direction of the rotor 3 along the blade 4 as described above can be ejected straight without changing the progressing direction by the skirt 2. In reaction to the above, propulsive force in the horizontal direction (that is, to move forward) can be obtained without tilting a nose of the disc-type vertical take-off and landing aircraft 1.

The details are described below.

Figure 7A:
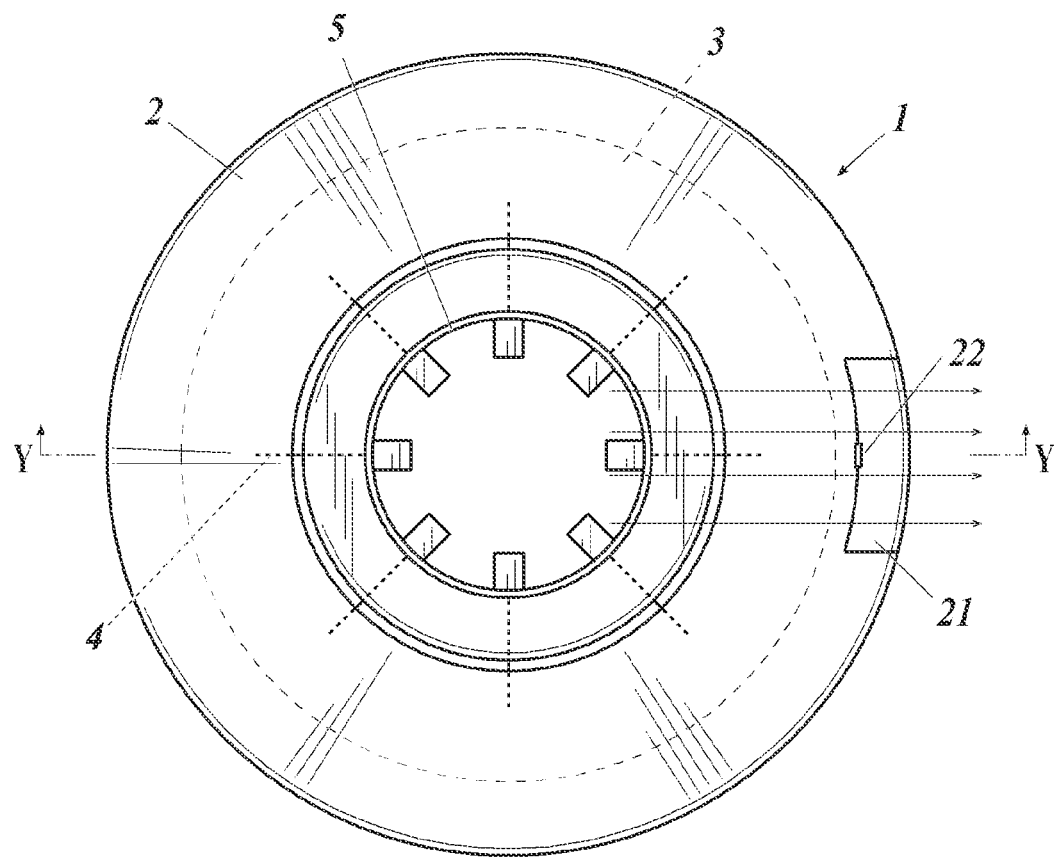
FIG. 7A is a plan view of the disc-type vertical take-off and landing aircraft which includes an opening and closing unit.
Figure 7B:
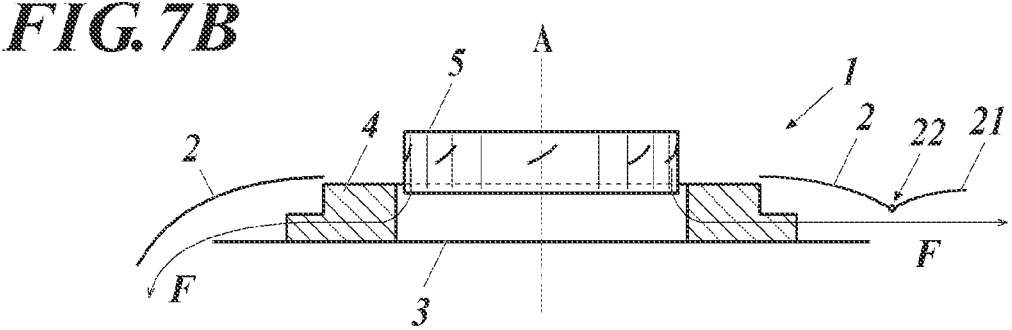
FIG. 7B is a cross-sectional view along line Y-Y shown in FIG. 7A.

FIG. 7A is a plan view of the disc-type vertical take-off and landing aircraft including an opening and closing unit. FIG. 7B is a cross-sectional diagram along line Y-Y shown in FIG. 7A. The description below describes when the disc-type vertical take-off and landing aircraft 1 includes the cylindrical fan 5, but the same can be said for the configuration not including the cylindrical fan 5.

For example, as shown in FIG. 7A, a portion of the lower end of the skirt 2 in the disc-type vertical take-off and landing aircraft 1 is cut and separated to form an opening and closing unit 21, and the opening and closing unit 21 is attached with a hinge 22 to the cutout portion where the opening and closing unit 21 is cutout and separated from. With this, in this case, an opening and closing unit 21 which can open and close in a vertical direction can be formed in the portion at the lower end of the skirt 2.

For example, the opening and closing unit 21 can be configured to open and close in a left-right direction (horizontal direction). Instead of the configuration to open and close by a hinge 22, for example, it is possible to configure the opening and closing unit 21 to open and close by sliding along the skirt 2. The method to open and close the opening and closing unit 21 is not limited to a specific method.

When the opening and closing unit 21 that can open and close a portion of the lower end of the skirt 2 is formed, if the opening and closing unit 21 is opened, as shown in FIG. 7B, in the portion where the opening and closing unit 21 is opened, the airflow F flowing along the blade 4 in the radial direction of the rotor 3 is ejected straight by the skirt 2 without changing the progressing direction.

Therefore, in reaction to the above, the disc-type vertical take-off and landing aircraft 1 is able to move in the horizontal direction (in this case, the left direction in the drawing) without tilting the nose. In the portion of the skirt 2 other than the opening and closing unit 21, as described above, the airflow F is ejected (jetted) downward. Therefore, the disc-type vertical take-off and landing aircraft 1 can move in the horizontal direction in a floating state.

If it is considered that the disc-type vertical take-off and landing aircraft 1 moving in the left direction of the drawing is moving forward, although illustration is omitted, if the opening and closing unit 21 is formed in the disc-type vertical take-off and landing aircraft 1 in the left side of the diagram similar to the above (that is, the front side of the disc-type vertical take-off and landing aircraft 1), the disc-type vertical take-off and landing aircraft 1 is able to move backward.

If the opening and closing unit 21 is formed in the upper side and the lower side in the disc-type vertical take-off and landing aircraft 1 in the diagram (that is, starboard side and port side of the disc-type vertical take-off and landing aircraft 1), the disc-type vertical take-off and landing aircraft 1 can move sideways.

As described above, by forming an opening and closing unit 21 that can open and close in a portion of the lower end of the skirt 2 and by opening the opening and closing unit 21, the disc-type vertical take-off and landing aircraft 1 can be moved in the direction opposite from the side where the opening and closing unit 21 is formed.

In this case, an opening and closing mechanism which is not shown is provided in the disc-type vertical take-off and landing aircraft 1 in order to open and close the opening and closing unit 21.

[Regarding Control of Orientation]
[Rolling Control and Pitching Control]

According to the configuration below, rolling control and pitching control can be performed in order to control orientation of the disc-type vertical take-off and landing aircraft 1.

That is, an oscillator is formed in a plurality of locations in the lower end of the skirt 2 so as to be able to oscillate toward the inner side of the skirt 2, and an oscillating angle for each oscillator is set to be different from each other. With this, a difference in the lift force can be generated in each portion of the disc-type vertical take-off and landing aircraft where the oscillator is formed. Consequently, the rolling control and the pitching control can be performed in the disc-type vertical take-off and landing aircraft 1.

The details are described below.

Figure 8A:
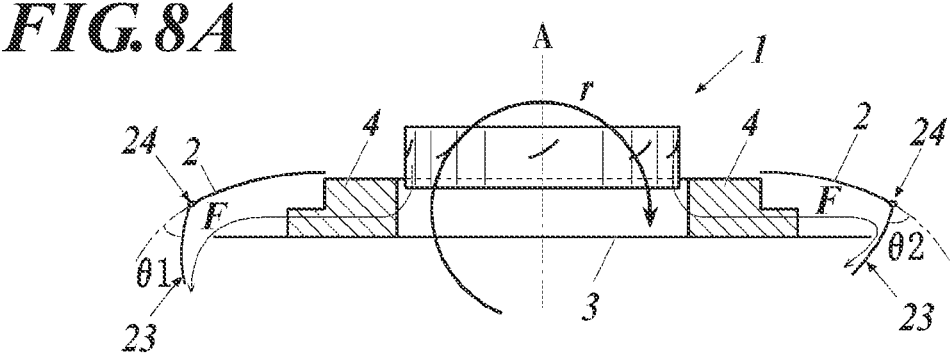
FIG. 8A is a cross-sectional view of the disc-type vertical take-off and landing aircraft including an oscillator.
Figure 8B:
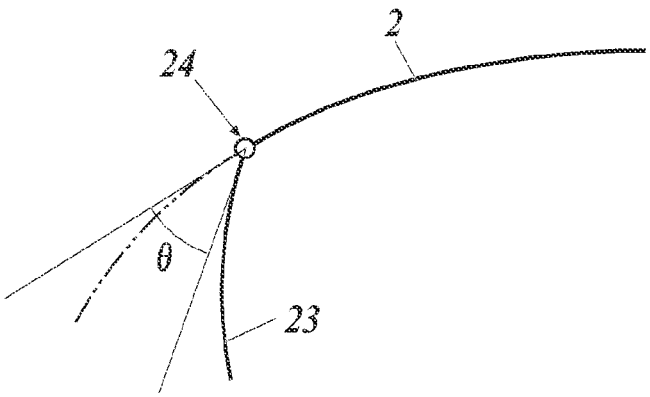
FIG. 8B is a diagram describing an oscillating angle of the oscillator.

FIG. 8A is a cross sectional view of the disc-type vertical take-off and landing aircraft including the oscillator, and FIG. 8B is a diagram describing the oscillating angle of the oscillator. In the following, an example in which the disc-type vertical take-off and landing aircraft 1 includes the cylindrical fan 5 is described, but the same can be said for the configuration not provided with the cylindrical fan 5.

For example, similar to the opening and closing unit 21 shown in FIG. 7A, an oscillator 23 is created by cutting out a plurality of positions of the lower end of the skirt 2 in the disc-type vertical take-off and landing aircraft 1, for example, the lower end of the skirt 2 in the port side and starboard side of the disc-type vertical take-off and landing aircraft 1. The oscillator 23 is attached to the cutout portion where the oscillator 23 is cut out from with a hinge 24. With this, the oscillator 23 which can oscillate toward the inner side of the skirt 2 can be formed in a plurality of positions in the lower end of the skirt 2.

In this case, an opening and closing mechanism which is not shown is provided in the disc-type vertical take-off and landing aircraft 1 in order to open and close the opening and closing unit 21. The above-described opening and closing unit 21 may be configured to also include the function of the oscillator 23.

When the oscillator 23 which can oscillate is formed in a plurality of positions in the lower end of the skirt 2, as shown in FIG. 8A, the ejecting direction of the airflow F can be changed by the oscillating angles θ1 and θ2 of the oscillator 23 when the direction of the airflow F flowing along the blade 4 in the radial direction of the rotor 3 is changed downwards by the oscillator 23 of the skirt 2.

That is, if the oscillating angle θ1 is relatively small as in the oscillator 23 on the port side shown in FIG. 8A, the airflow F flowing along the blade 4 is ejected downward by the oscillator 23. If the oscillating angle θ2 is large as in the oscillator 23 on the starboard side shown in FIG. 8A, the airflow F flowing along the blade 4 is ejected to the inner side by the oscillator 23.

As shown in FIG. 8B, the oscillating angle θ of the oscillator 23 is defined as the angle formed by a tangent line of the oscillator 23 in the hinge 24 before oscillating the oscillator 23, and the tangent line of the oscillator 23 in the hinge 24 after the oscillator 23 is oscillated.

Then, compared to when the airflow F is ejected downwards as in the oscillator 23 on the port side, the lift force of the starboard side becomes small when the airflow F is ejected to the inner side as in the oscillator 23 on the starboard side.

As described above, for example, by forming the oscillator 23 on the port and starboard sides of the disc-type vertical take-off and landing aircraft 1, and by setting the oscillating angles θ1 and θ2 of the oscillators 23 to be different, a difference in the lift force can be generated in each portion of the disc-type vertical take-off and landing aircraft 1 that the oscillators 23 are formed, that is, in this case, the port and starboard sides of the disc-type vertical take-off and landing aircraft 1.

Therefore, by oscillating the oscillators 23 with oscillating angles θ1 and θ2 different from each other between the port side and the starboard side of the disc-type vertical take-off and landing aircraft 1 as shown in FIG. 8A, in the example shown in FIG. 8A, the lift force becomes larger in the port side of the disc-type vertical take-off and landing aircraft 1 than in the starboard side. Therefore, as shown with an arrow r in the drawings, in this case, it is possible to roll the disc-type vertical take-off and landing aircraft 1 so that the port side rises and the starboard side falls.

Although illustration is omitted, if the oscillating angles θ1 and θ2 of the oscillators 23 in the port and starboard sides of the disc-type vertical take-off and landing aircraft 1 are set to be opposite, the disc-type vertical take-off and landing aircraft 1 can be controlled to roll in the opposite direction so that the starboard side rises and the port side falls (the above is the rolling control).

FIG. 8A describes the left side of the drawing to be the port side of the disc-type vertical take-off and landing aircraft 1 and the right side of the drawing to be the starboard side of the disc-type vertical take-off and landing aircraft 1. Alternatively, for example, the left side of FIG. 8A is considered to be the front end of the disc-type vertical take-off and landing aircraft 1 and the right side of FIG. 8A is considered to be the back end of the disc-type vertical take-off and landing aircraft 1. If the oscillator 23 is formed in the front end and the back end of the disc-type vertical take-off and landing aircraft 1, and control is performed so that the oscillating angles θ of the oscillators 23 are different from each other, it is possible to control the disc-type vertical take-off and landing aircraft 1 to pitch so that the front end rises and the back end falls, or the back end rises and the front end falls (the above is the pitching control).

According to the above configuration, the opening and closing unit 21 and the oscillator 23 are formed in the front end and the back end, and the port side and the starboard side of the disc-type vertical take-off and landing aircraft 1. Alternatively, the above units can be formed in other positions, and the positions and the number of units of the opening and closing unit 21 and the oscillator 23 that are formed are suitably determined.

[Yawing Control]

According to the configuration described below, yawing control can be performed as one way to control the orientation of the disc-type vertical take-off and landing aircraft 1.

That is, a guide can be provided on the inner surface of the skirt 2 in order to change the ejecting direction of the airflow F so as to change the direction and the magnitude of the force to rotate the skirt 2 around the central axis A of the skirt 2 (that is, around the central axis A of the disc-type vertical take-off and landing aircraft 1). In the following, an example in which the disc-type vertical take-off and landing aircraft 1 includes the cylindrical fan 5 is described, but the same can be said for the configuration not provided with the cylindrical fan 5.

Figure 9:
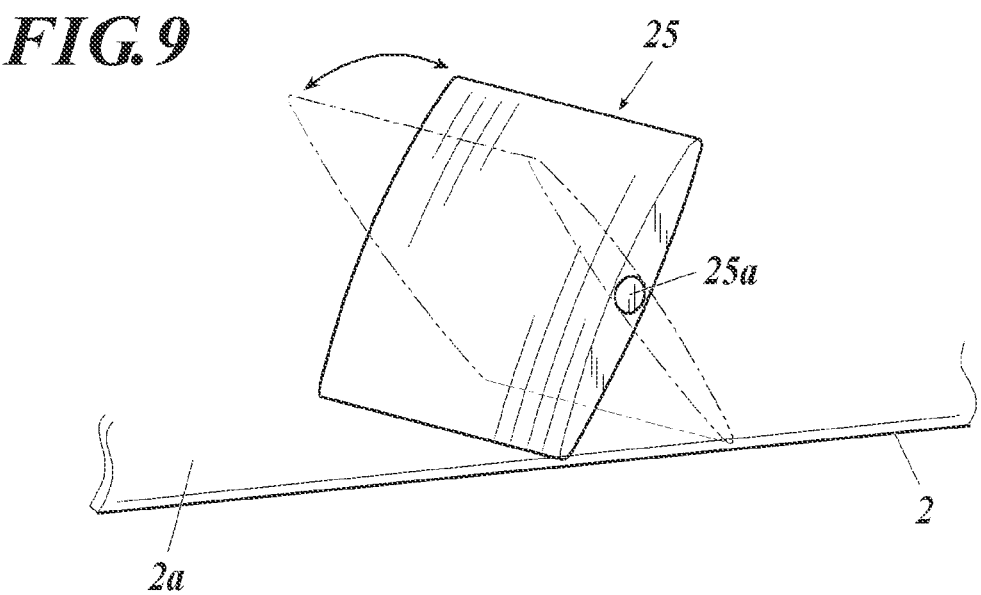
FIG. 9 is a diagram showing an example of a configuration of a guide.

For example, as shown in FIG. 9, a guide 25 in a substantial plate shape is provided toward an inner direction from the inner surface 2*a* of the skirt 2. The guide 25 is able to rotate around a rotating axis 25*a*.

Such guides 25 are provided throughout the entire circumference of the skirt 2 or one or a plurality of guides 25 are provided in suitable positions of the skirt 2. A rotating mechanism which is not shown is provided in the disc-type vertical take-off and landing aircraft 1 in order to rotate the guide 25.

Figure 10A:
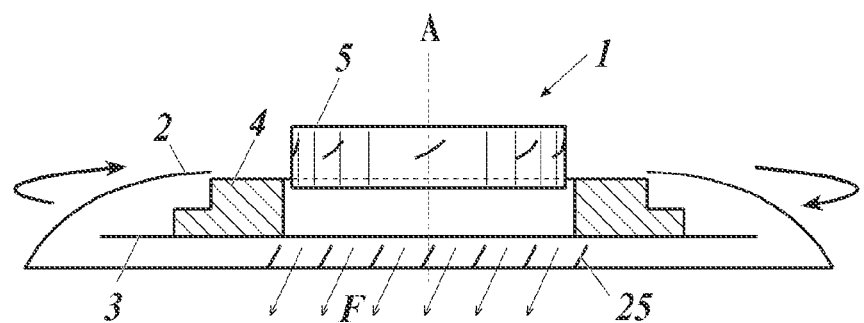
FIG. 10A is a cross-sectional view showing a state of the guide rotated and tilted.

Then, for example, when the guide 25 is rotated and, as shown in the cross-sectional view in FIG. 10A, is tilted at the far side of the diagram from the upper right of the diagram to the lower left of the diagram, the direction of the ejected airflow F is a direction flowing from the upper right of the diagram to the lower left of the diagram at the far side of the diagram.

Therefore, in this case, since force in the right direction is added to the guide 25 at the far side in the diagram by the airflow F, a force is applied to rotate the skirt 2 around the central axis A in a clockwise direction viewing the disc-type vertical take-off and landing aircraft 1 downward from the upper side.

Figure 10B:
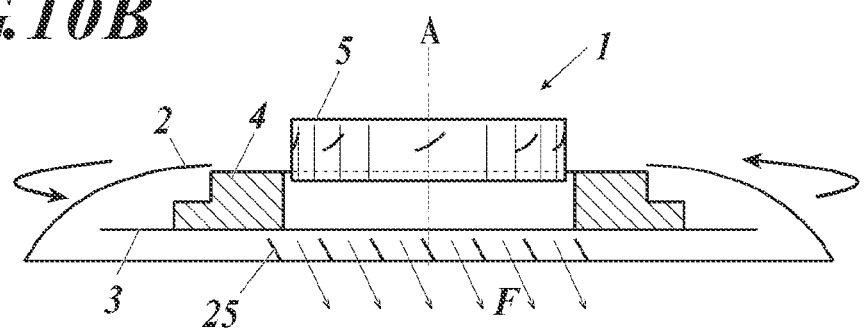
FIG. 10B is a cross-sectional view showing a state in which the guide is rotated and tilted in another direction.

Alternatively, for example, when the guide 25 is rotated and, as shown in the cross-sectional view in FIG. 10B, is tilted at the far side of the diagram from the upper left of the diagram to the lower right of the diagram, the ejecting direction of the airflow F can be changed so that the direction of the ejected airflow F is a direction flowing from the upper left of the diagram to the lower right of the diagram at the far side of the diagram.

In this case, since the force in the left direction is applied to the guide 25 at the far side in the diagram by the airflow F, the force is applied to rotate the skirt 2 around the central axis A in a counter-clockwise direction viewing the disc-type vertical take-off and landing aircraft 1 downward from the upper side. The direction of the force to rotate the skirt 2 around the central axis A can be changed by changing the tilt of the guide 25.

Then, in both examples shown in FIG. 10A and FIG. 10B, the force to rotate the skirt 2 around the central axis A can be made stronger by making the tilt of the guide 25 with relation to the central axis A larger.

Therefore, by changing the tilt of the guide 25 with relation to the central axis A and changing the ejecting direction of the airflow F, it is possible to change the magnitude of the force to rotate the skirt 2 around the central axis A.

As described above, by providing the above-described guide 25 on the inner surface of the skirt 2 of the disc-type vertical take-off and landing aircraft 1, and by changing the ejecting direction of the airflow F by changing the tilt of the guide 25 with relation to the central axis A, it is possible to accurately change the direction and the magnitude of the force to rotate the skirt 2 around the central axis A.

Then, by rotating the skirt 2 around the central axis A, the disc-type vertical take-off and landing aircraft 1 can be rotated clockwise or counter-clockwise around the central axis A viewing the disc-type vertical take-off and landing aircraft 1 downward from the upper side, and it is possible to accurately perform yawing control of the disc-type vertical take-off and landing aircraft 1.

When the tilt of the guide 25 with relation to the central axis A becomes too large, the force to rotate the skirt 2 around the central axis A becomes weak, and the guide 25 interferes with the ejecting of the airflow F.

Therefore, the rotation of the guide 25 around the rotating axis 25*a* (that is, changing the tilt of the guide 25 with relation to central axis A) is performed within a suitable range so as not to interfere with the ejecting of the airflow F.

The disc-type vertical take-off and landing aircraft 1 according to the present embodiment is configured so that the rotor 3 rotates around the central axis A with respect to the skirt 2. When the cylindrical fan 5 is provided, the cylindrical fan 5 also rotates around the central axis A.

Therefore, if no measures are taken (that is, if the guide 25 is maintained in a direction pointing straight down), the skirt 2 receives counter force from the rotor 3 and the cylindrical fan 5, and the skirt 2 rotates around the central axis A in a direction opposite from the rotor 3.

Therefore, according to the present embodiment, the guide 25 is rotated around the rotating axis 25*a* tilted so that the force to rotate the skirt 2 around the central axis A is generated in the skirt 2 in a direction opposite to the rotor 3, etc. (that is, anti-torque with relation to the rotation of the rotor 3, etc.).

By generating the anti-torque as described above, the skirt 2 does not rotate around the central axis A and stays still when the disc-type vertical take-off and landing aircraft 1 does not perform the yaw motion.

The present invention is not limited to the above embodiments, and can be suitably changed without leaving the scope of the present invention.

INDUSTRIAL APPLICABILITY

The present invention can be applied to vertical take-off and landing aircrafts.

REFERENCE SIGNS LIST

1 disc-type vertical take-off and landing aircraft
2 skirt
2*a* inner surface of skirt
3 rotor
4 blade
4*a* cutout
5 cylindrical fan
21 opening and closing unit
23 oscillator
25 guide
51 fan blade
A central axis
F airflow
f flow of air
$\theta$ oscillating angle

The invention claimed is:

1. A disc-type vertical take-off and landing aircraft comprising:
   a skirt that widens toward a bottom;
   a disc-shaped rotor that is positioned on a lower side of the skirt and that rotates with relation to the skirt;
   a plurality of blades that are provided standing on an upper surface of the disc-shaped rotor and that are positioned radially from a center of the disc-shaped rotor; and
   a plate-shaped member that is provided with an opening at a central portion and that links upper portions of the plurality of blades,
   wherein a cutout is formed in each of the plurality of blades,
   wherein air that flows from the opening passes a space that is formed surrounded by the skirt, the disc-shaped rotor and the plate-shaped member, and a portion divided by each of the plurality of blades, and
   wherein when the disc-shaped rotor rotates, centrifugal force causes an airflow along the blade rotating with the disc-shaped rotor, the airflow swirls in a spiral by a flow of air flowing over the cutout of the blade in a direction substantially orthogonal to the blade, the airflow flows in a radial direction of the disc-shaped rotor along the blade while swirling in the spiral, and the airflow ejected downward by the skirt causes the disc-type vertical take-off and landing aircraft to ascend.

2. The disc-type vertical take-off and landing aircraft according to claim 1, wherein a cylindrical fan is positioned above the disc-shaped rotor, the cylindrical fan including a fan blade that rotates and sends air to a central portion of the disc-shaped rotor.

3. The disc-type vertical take-off and landing aircraft according to claim 2,
   wherein an opening and closing unit that is able to open and close is formed in a portion of a lower end of the skirt, and
   wherein when the opening and closing unit opens, the airflow flowing in the radial direction of the disc-shaped rotor along the blade is ejected straight without a direction being changed by the skirt.

4. The disc-type vertical take-off and landing aircraft according to claim 2,
   wherein oscillators are formed in a plurality of positions in a lower end of the skirt, each of the oscillators capable of oscillating toward an inner side of the skirt, and
   wherein oscillating angles of the oscillators are set to be different from each other and a difference in lift force can be generated in each portion of the disc-type vertical take-off and landing aircraft where the oscillators are formed.

5. The disc-type vertical take-off and landing aircraft according to claim 2,
   further comprising a guide on an inner surface of the skirt,
   wherein the guide changes an ejecting direction of the airflow and changes a direction and/or magnitude of a force that rotates the skirt around a central axis of the skirt.

6. The disc-type vertical take-off and landing aircraft according to claim 1,
   wherein an opening and closing unit that is able to open and close is formed in a portion of a lower end of the skirt, and
   wherein when the opening and closing unit opens, the airflow flowing in the radial direction of the disc-shaped rotor along the blade is ejected straight without a direction being changed by the skirt.

7. The disc-type vertical take-off and landing aircraft according to claim 6,
   wherein oscillators are formed in a plurality of positions in the lower end of the skirt, each of the oscillators capable of oscillating toward an inner side of the skirt, and
   wherein oscillating angles of the oscillators are set to be different from each other and a difference in lift force can be generated in each portion of the disc-type vertical take-off and landing aircraft where the oscillators are formed.

8. The disc-type vertical take-off and landing aircraft according to claim 6,
   further comprising a guide on an inner surface of the skirt,
   wherein the guide changes an ejecting direction of the airflow and changes a direction and/or magnitude of a force that rotates the skirt around a central axis of the skirt.

9. The disc-type vertical take-off and landing aircraft according to claim 1,
   wherein oscillators are formed in a plurality of positions in a lower end of the skirt, each of the oscillators capable of oscillating toward an inner side of the skirt, and
   wherein oscillating angles of the oscillators are set to be different from each other and a difference in lift force can be generated in each portion of the disc-type vertical take-off and landing aircraft where the oscillators are formed.

10. The disc-type vertical take-off and landing aircraft according to claim 9,
    further comprising a guide on an inner surface of the skirt,
    wherein the guide changes an ejecting direction of the airflow and changes a direction and/or magnitude of a force that rotates the skirt around a central axis of the skirt.

11. The disc-type vertical take-off and landing aircraft according to claim 1,
    further comprising a guide on an inner surface of the skirt,
    wherein the guide changes an ejecting direction of the airflow and changes a direction and/or magnitude of a force that rotates the skirt around a central axis of the skirt.

12. The disc-type vertical take-off and landing aircraft according to claim 1,
    wherein each of the plurality of blades and the cutout that is formed in each of the plurality of blades has a same shape.

13. The disc-type vertical take-off and landing aircraft according to claim 1, wherein each of the plurality of blades has a rectangular shape, and
    wherein the cutout has a rectangular shape.

14. The disc-type vertical take-off and landing aircraft according to claim 1, wherein the cutout is formed at an outer side in the radial direction and an upper edge nearest the skirt of each of the plurality blades.

15. The disc-type vertical take-off and landing aircraft according to claim 14, wherein a length of the upper edge of each of the plurality of blades is greater than a length of the cutout.

16. The disc-type vertical take-off and landing aircraft according to claim 1, wherein each of the plurality of blades extends radially from the center of the disc-shaped rotor as a constant angle.

* * * * *